United States Patent Office 3,486,219
Patented Dec. 30, 1969

3,486,219
METHOD OF MAKING TUBES
Jared Marshall Davies, Abingdon, and Colin Steer, Harwell, near Didcot, England, assignors to United Kingdom Atomic Energy Authority, London, England
No Drawing. Filed Feb. 28, 1966, Ser. No. 530,350
Claims priority, application Great Britain, Mar. 1, 1965, 8,676/65
Int. Cl. C21d 7/14
U.S. Cl. 29—480     17 Claims

ABSTRACT OF THE DISCLOSURE

A method of homogenising the structure of butt welded tubes comprises the steps of working the tubes by planetary swaging to deform the grain structure thereof, and subsequently heat treating the tube material to effect recrystallization of the structure. The resulting structure is uniform as are the mechanical properties throughout the tube.

---

The invention relates to the fabrication of tubes and is particularly, but not exclusively, concerned with tubes suitable for use in nuclear energy applications.

The use of drawn tubes has several drawbacks in regard to cost of production and the possibility of the drawing process promoting defects in the tubes which are difficult to detect using non-destructive testing methods.

Butt welded tubes can be manufactured at lower cost and since the tubes are formed from flat strip material of high quality, which is easily inspected, the use of butt welded tubes would appear advantageous for nuclear energy work. However the use of welded tubes particularly for nuclear fuel sheathing poses problems due to the difference of structure and mechanical properties between the initial strip material, the weld and the heat affected zones. The difficulties apply to ferrous and non-ferrous materials and the object of the present invention is to provide a method of producing or treating a butt welded tube such that the effect of the weld on the structure of the tube is minimised.

According to the present invention, a method of homogenising the structure of a butt welded tube comprises the steps of working the tube by planetary swaging to deform the grain structure of the tube, and subsequently heat treating the tube material to affect recrystallization of the structure.

Also, according to the present invention a method of homogenising the structure of a tube formed by butt welding comprises the steps of reducing the wall thickness of the tube by planetary swaging and subsequently heat treating the tube material to affect recrystallisation of the structure.

The planetary swaging may be carried out as a cold working process.

Also according to the invention a method of producing a tube from plate material comprises the step of forming the plate into tubular form, welding the contiguous edges of the plate, working the tube by planetary ball swaging to reduce the wall thickness of the tube and subsequently heat treating the tube to effect recrystallisation of the structure of the tube.

In one preferred use of the invention a tube of austenitic stainless steel is formed from flat strip, autogenously butt welded, planetary ball swaged to reduce the wall thickness by between 15% and 32%, subsequently heat treated at 1050° C. to obtain complete solid solution and recrystallisation.

In a further preferred use of the invention a tube of nominal composition 25% chromium, 25% nickel, niobium stabilised, is formed from flat strip, autogenously butt welded, planetary swaged to reduce the tube wall thickness by between 50%–65% and heat treated to obtain recrystallisation of the structure.

The heat treatment preferably comprises heating to 1050° C. for 15 minutes followed by a quick cooling step.

In another use of the invention a butt welded zircalloy tube is cold worked by planetary ball swage and the subsequent heat treatment carried out at a temperature under the $\alpha$-$\beta$ transformation temperature of the zircalloy.

The zircalloy tube may be welded longitudinally, cold worked by planetary ball swage to effect a wall thickness reduction in the range of 45%–55% and subsequently heat treated for a suitable time within the temperature range 820° C.–860° C.

Additionally, when the zircalloy tube is welded both longitudinally and circumferentially the reduction in wall thickness, effected by cold working with a planetary ball swage, is preferably 45%±2% and the heat treatment applied for a suitable time within the temperature range 820°–860° C.

To enable the nature of the invention to be more readily understood several examples of the invention will now be described. In each example the swaging operations were carried out on planetary ball swaging apparatus of the type described in British Patent No. 946,407.

EXAMPLE I

An austenitic stainless steel seamed tube, formed from flat strip by rolling and argon arc butt welding the longitudinal contiguous edges of the tube, has a wall thickness of 0.035 inch and a nominal composition of 18% Cr, 8% Ni titanium stabilised. A tube in the as welded condition comprises a cast dendritic structure of austenite with a little ferrite in the weld. The structure of the heat affected zones include very large austenite grains immediately adjacent to the weld, with a graded reduction, towards the parent strip, to austenite grains of a size similar to those in the parent strip and showing evidence of carbide precipitation adjacent to the parent strip. Each tube is cold worked by planetary ball swage to effect a reduction in wall thickness and deformation of the structure in all three regions. The tube is passed through the planetary ball swage apparatus a number of times to effect the desired percentage reduction in wall thickness.

With reductions of wall thickness under 14% a subsequent heat treatment at 1050° C. for 15 minutes does not achieve complete homogenisation and the parent strip, the weld and the heat affected zone are easily distinguishable one from the other. The differences in hardness between the three regions at this stage is pronounced.

When the reduction in tube wall thickness lies within the range 14%–32% of initial wall thickness and is followed by annealing at 1050° C. for 15 minutes with subsequent quenching in oil, the resultant tube is of uniform structure having equiaxial grains of austenite with a little ferrite distributed throughout the tube. Results of a hardness survey indicate that the mechanical properties of the parent strip, the weld and the heat affected zones are also uniform after this treatment. Internal burst tests carried out on the homogenised tubes produced using this technique show no tendency for failure to occur near the original welds or heat affected zones. The positions of the failures are completely random and the burst strengths and ductilities obtained compared favourably with those obtained for solid drawn tubes.

EXAMPLE II

Longitudinal and circumferential autogenous welds are produced in tubes of zircalloy 2 (0.5 in. O.D.×0.020 in. wall thickness) by electron beam welding in a vacuum of $3 \times 10^{-4}$ torr. Electron beam welding is particularly suitable because of the structure of the welds and heat affected zones produced in the zircalloy 2. The compositions of the zircalloy 2 tubes is tin 1.38%, chromium 0.084%, nickel 0.043% and iron 0.071%. The structure in the weld, the heat affected zones and parent material in each tube is broken down by cold planetary ball swaging and the resulting deformed structures recrystallised by heat treatment. The heat treatment is preferably carried out under conditions ensuring a protective atmosphere (helium, argon, etc.) and the time at temperature kept constant at 1 hour. The tubes are allowed to cool in the furnace from the heat treatment temperature, the vacuum or protective atmosphere being maintained during the cooling down period.

A zircalloy tube in the "as welded" condition comprises a coarse cast structure in the weld and an annealed structure of $\alpha$ solid solution with particles of intermetallic compound $Zr_4Sn$ along grain boundaries and crystallographic planes in the parent material. The structure of the heat affected zones comprises a Widmanstatten type structure and shows a structure gradient which varies from that of the coarse cast structure of the weld through transformed $\beta$ structure to the annealed structure of the parent material.

Dealing firstly with longitudinal welds, it is found that after 35% reduction in wall thickness and heat treatment at 845° C. for 1 hour, homogenisation is not complete and the various regions are easily distinguished.

With an increased amount of cold work i.e. 45% to 55% reduction in wall thickness it is desirable to anneal at temperatures within the range 820° C–890° C. in order to obtain complete homogenisation of the structures. Higher temperatures should not be used since it is desirable that the annealing temperature does not reach the $\alpha$–$\beta$ transformation temperature, otherwise a detrimental effect is experienced on the structures.

When the cold work is increased to 60% reduction in wall thickness followed by annealing at 840° C.–890° C., complete recrystallisation and homogenisation of the structures in the various zones is achieved, but the mechanical properties, as indicated by a hardness survey, are not uniform.

With circumferential welds, cold working of up to 35% reduction in wall thickness with heat treatment at 845° C. for 1 hour produces pronounced structural differences between the regions. With a 35%–40% reduction in wall thickness followed by heat treatment at 845° C. for 1 hour, good homogenisation of the structures and mechanical properties is achieved. When the wall thickness reduction is increased to above 40% followed by annealing at 845° C. for 1 hour, the standard of homogenisation of the structures and mechanical properties deteriorates, the differences between the various zones becoming more pronounced.

The optimum conditions for the welded zircalloy 2 tubes are (a) in the case of longitudinal welds 45%–55% cold reduction in wall thickness, (b) for circumferential welds 35%–40% cold reduction in wall thickness, (c) at the intersection of the circumferential and longitudinal welds 45%±2% cold reduction in wall thickness, followed in each case by heat treatment at 820° C.–860° C. for 1 hour. Fulfilling the optimum conditions it is possible to obtain a uniform homogenised structure and uniform mechanical properties in the various regions of the tubes. Under test, one region can not be distinguished from the others by metallographic examination, hardness survey or internal hydraulic pressure burst tests.

EXAMPLE III

Stainless steel tubes (20% chromium, 25% nickel, niobium stabilised) of 0.40 inch internal diameter and wall thickness of 0.031 inch are produced from strip and autogenous butt welded. A number of said longitudinal butt welded tubes may be joined together by autogenous butt welding and homogenised as follows.

The tubes are ball swaged to effect a cold working reduction of wall thickness of between 50–75%, heated for 15 minutes at approximately 1050° C. and quickly cooled. The tubes are preferably heated by soaking in an argon atmosphere at said temperature and cooled by a rapid oil quenching in order to ensure the retention of the solid solution and the prevention of excessive oxidation of the surfaces of the tube. After treatment, homogenisation is such that the weld and heat affected zones cannot be distinguished from the parent metal by optical metallography, hardness testing or internal pressure burst testing.

With up to 50% reduction in wall thickness the homogenisation is not complete and the various zones can be distinguished after heat treatment and cooling. However, with increased amounts of cold working i.e. about 50%–65% reduction in wall thickness good homogenisation of the structures is achieved. Increased cold working above 65% resulted in slight deterioration of the homogenisation achieved.

Optimum homogenisation of the tube structures is achieved (a) in the case of longitudinally extending butt welds by planetary swage cold working to 54%–63% reduction in wall thickness, (b) for circumferential butt welds after cold planetary swage working to 54%–61% reduction in wall thickness and (c) at the intersection of longitudinal and circumferential butt welds at cold working to 53%–65% reduction in wall thickness followed in each case by heat treatment at 1050° C. for 15 minutes.

Since the 20/25 stainless steel butt welded tubes described are particularly suitable as fuel element canning material and the treated tubes have a grain size about 30$\mu$ it has been found advantageous to institute a second stage process of cold planetary swaging and subsequent heat treatment whereby the grain size may be controlled. A reduction of 55%–65% in wall thickness by cold working and heat treatment at 800°–950° C. for an extended time (5 hours approx.) will produce a fine grain structure ($<7\mu$) having a suitable burst ductility.

Planetary swaging is a very suitable process for applying the cold work because of the mode of deformation inherently obtained. In addition to the longitudinal deformation produced axially along the tubes, there are pronounced circumferential effects produced by the rotational movement of the swaging head, the combination of which results in a large number of randomly distributed nuclei for new grains to form during the recrystallisation heat treatment. The greater the number of passes used to achieve a given reduction in wall thickness, the greater becomes the influence of the circumferential effects due to the rotational movement of the swaging head and the less the number of passes the greater becomes the influence of the longitudinal effects produced axially along the tubes. One of the advantages of planetary swaging as a fabrication process is the heavy reductions in wall thickness possible per pass. The wall thickness of stainless steel tubes in the annealed condition may be reduced by up to 60% in one pass.

It will be appreciated that the production of tubes by the method described has inherent economic and technical advantages over the conventional tube extrusion or drawing processes, for example zircalloy tubes having improved concentricity may be produced more cheaply by forming strip by bending or helical winding into a tubular configuration, electron beam welding the contiguous edges and homogenising the tube by planetary ball swaging and heat treatment. It will also be appreciated that the invention is not limited to the examples given and that other tube materials can be successfully treated for example, nickel based iron containing alloys such as Hastelloy-X, other alloys such as the nimonic alloys and alloys of niobium, titanium and tantalum,

We claim:
1. A method of homogenising the structure of a tube formed by butt welding which comprises the steps of reducing the wall thickness of the tube by planetary swaging and subsequently heat treating the tube material to effect recrystallisation of the structure.

2. A method according to claim 1 wherein the planetary swaging comprises a cold working process.

3. A method of producing a tube from plate material which comprises the step of forming the plate into tubular form, welding the contiguous edges of the plate, working the tube by planetary ball swaging to reduce the wall thickness of the tube and subsequently heat treating the tube to effect recrystallisation of the structure of the tube.

4. A method of producing a tube according to claim 3 wherein the tube is formed from a flat strip of austenitic stainless steel, cold worked by planetary ball swage to reduce the wall thickness by between 15% and 32%, and subsequently heat treated at 1050° C. to obtain complete solid solution and recrystallisation of the tube structure.

5. A method of producing a tube according to claim 3 wherein a tube of nominal composition 20% chromium 25% nickel, niobium stabilised, is formed from flat strip, autogenously butt welded, planetary swaged to reduce the tube wall thickness by between 50%–65% and heat treated to obtain recrystallisation of the structure of the tube.

6. A method of producing a tube according to claim 5 wherein the tube is welded longitudinally and the wall thickness reduced by between 54%–63%.

7. A method of producing a tube according to claim 5 wherein the tube is welded circumferentially and the wall thickness reduced by between 54%–61%.

8. A method of producing a tube according to claim 5 wherein the tube is welded both longitudinally and circumferentially and the wall thickness reduced by between 53%–65%.

9. A method of producing a tube according to claim 5, wherein the heat treatment comprises soaking the tube in an argon atmosphere at 1050° C. for 15 minutes followed by a rapid oil quenching.

10. A method of producing a tube wherein a butt-welded tube formed from a zircalloy strip is cold worked by planetary ball swaging to reduce the wall thickness of said tube and subquently heat treated at a temperature under the α-β transformation temperature of the zircalloy.

11. A method of producing a tube according to claim 10 wherein the tube is formed from a strip of zircalloy, welding the antiguous edges of the plate using an electron beam, cold working by planetary swage to effect a reduction in tube wall thickness within the range 35% to 55% and subsequently heat treated within the temperature range 820°–860° C. for one hour.

12. A method of producing a tube according to claim 11 wherein the tube is welded longitudinally, the wall thickness reduced in the range of 45%–66% and subsequently heat treated at 845° C. for one hour.

13. A method of producing a tube according to claim 11 wherein the tube is circumferentially welded, the tube wall thickness reduced in the range of 35%–40% and subsequently heat treated at 820°–860° C. for one hour.

14. A method of producing a tube according to claim 11 wherein the tube is both longitudinally and circumferentially welded, reduced in tube wall thickness in the range 43%–47% and subsequently heat treated at 820°–860° C. for one hour.

15. A method of homogenising the structure of a butt welded tube, which method comprises the steps of working the tube by planetary swaging to deform the grain structure of the tube, and subsequently heat treating the tube material to effect recrystallization of the structure.

16. A method according to claim 15 wherein the planetary swaging comprises a cold working process.

17. A method of homogenising the structure of a butt welded tube, which method comprises the steps of planetary swaging the tube to reduce the outer diameter of the tube and to deform the grain structure thereof, and subsequently heat treating the tube to effect recrystallization of the structure.

References Cited

UNITED STATES PATENTS

| | | | |
|---|---|---|---|
| 1,996,775 | 4/1935 | Sims | 29—480 |
| 2,693,632 | 11/1954 | Heussner | 29—480 X |
| 2,712,249 | 7/1955 | Siegerist | 29—480 X |
| 2,883,744 | 4/1959 | Barnhart | 29—480 X |
| 2,977,914 | 4/1961 | Gray et al. | 29—480 X |

FOREIGN PATENTS 046,407  1/1964  Great Britain.

OTHER REFERENCES

Elements of Materials Science, Van Vlack, 1959, pp. 79–86.

Fundamentals of the Working of Metals, Sachs, 1954, pp. 61–64.

Physical Metallurgy, Chaimers, 1962, p. 343.

Stainless Steels, Zapfee, 1949, pp. 226, 228–229.

Metallurgy In Nuclear Power Technology, 1962, Wright, pp. 88–90.

JOHN F. CAMPBELL, Primary Examiner

J. L. CLINE, Assistant Examiner

U.S. Cl. X.R.

29—487; 72—76; 148—11.5, 12.1